Feb. 28, 1961  R. W. JENSEN  2,972,869
MEANS FOR SYNCHRONIZING A PLURALITY OF PNEUMATIC MOTORS
Filed April 24, 1959
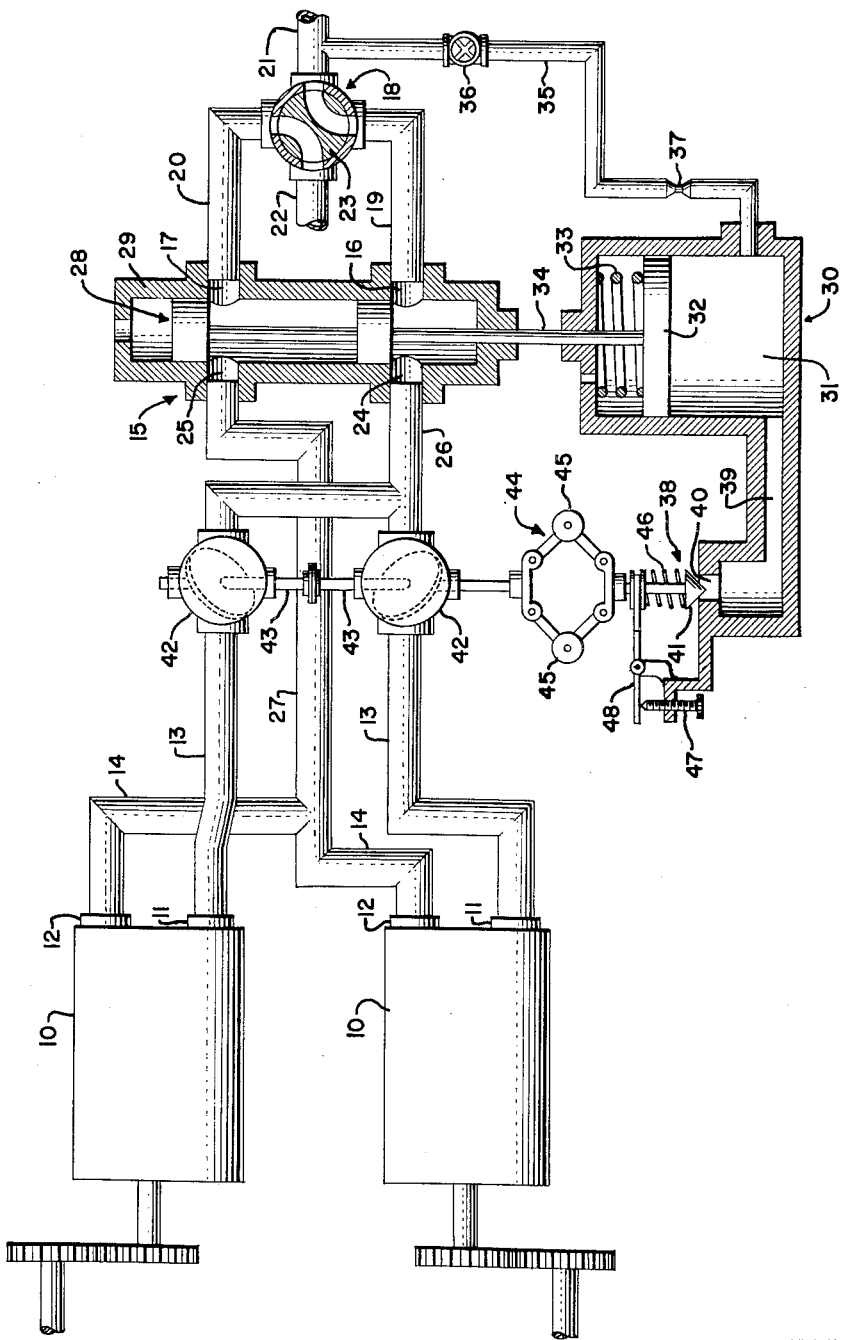
INVENTOR.
RAYMOND W. JENSEN
BY
Herschel C. Omohundro
ATTORNEY

United States Patent Office 2,972,869
Patented Feb. 28, 1961

2,972,869

MEANS FOR SYNCHRONIZING A PLURALITY OF PNEUMATIC MOTORS

Raymond W. Jensen, Los Angeles, Calif., assignor to The Garrett Corporation, Los Angeles, Calif., a corporation of California Filed Apr. 24, 1959, Ser. No. 808,735

12 Claims. (Cl. 60—97)

This invention relates generally to fluid pressure responsive mechanism and is more particularly directed to a system and apparatus for controlling the operation of a plurality of fluid motors. Still more particularly, the invention is directed to means for synchronizing and governing the operation of a plurality of fluid motors.

In the operation of many pieces of apparatus it is necessary to move control elements requiring considerable actuating force. Frequently such control elements are of a size and/or construction that the actuating forces must be applied at various spaced locations and synchronized to insure proper results. Flexibility of operation and control are many times necessary; consequently, fluid forces have been found quite attractive. In the use of fluid forces in some situations, however, the problem of control is encountered. One instance is in the use of two or more fluid actuators which must exert predetermined forces or operate at related speeds. It is an object of this invention to provide a control system for a plurality of fluid motors which will insure the simultaneous operation of the motors, the synchronization of operation thereof, and the development of a predetermined relation of forces by the motors.

Another object of the invention is to provide a control system of relative simplicity which will cause a plurality of fluid actuators to operate in complete synchronization and at a predetermined speed.

Still another object of the invention is to provide a control system for a plurality of fluid motors, the system having a main control valve means and a plurality of interrelated metering devices which are operative to cause unitary action of the motors and effect the operation of valve actuating means to govern the flow of operating medium to the motors whereby a selected speed of operation will be maintained.

A further object of the invention is to provide a control system for a plurality of fluid motors, the system having a valve means operative to control fluid flow to and from the motors, flow dividing or metering means for causing a predetermined distribution of the fluid to the motors, and means responsive to the operation of the flow dividing means to adjust the valve means to maintain a selected rate of operation of the motors.

A still further object of the invention is to provide a control system for a plurality of fluid motors, the system including a main valve means having a fluid pressure responsive actuator and bleed-off means for controlling the application of fluid pressure to the actuator, the system also including metering devices coupled together for operation whereby the motors will be caused to function at the same rate, a governor type of actuating means being provided for the bleed-off means so that a predetermined rate of motor operation will be maintained.

Another object of the invention is to provide a control system for a plurality of fluid motors, the system having a main valve, a fluid pressure responsive actuator therefor, a bleed-off control for governing the operation of the valve actuator, and a positive displacement type metering means for each motor, such metering means being connected so that they will operate in unison and supply the same amount of fluid to each motor, thus causing the motors to be driven at the same rate, actuating means of the centrifugally responsive type being provided to actuate the bleed-off control and govern the application of fluid pressure to the main valve actuator.

With these and other objects in view, which will appear as the description proceeds, the invention consists in the novel features of construction and combinations of elements set forth in the following part of this specification taken in connection with the accompanying drawing in which the single figure is a schematic view of a fluid motor control system embodying the features of the invention.

Referring more particularly to the drawing, the numeral 10 designates a fluid motor. This motor may be of the reciprocating, the rotary or any other type, such as those shown in copending applications by Jensen et al., Serial Nos. 650,933, now Patent No. 2,896,590, dated July 28, 1959, and 697,608, now Patent No. 2,948,265, dated August 9, 1960, filed April 5, 1957, and November 20, 1957, respectively. In the system selected for illustration two of such motors are employed. It should be obvious that the system is applicable to as many motors as may be desired or required. The motors 10 are each provided with two ports 11 and 12 capable of serving as either inlet or outlet ports and with which are connected a pair of conduits 13 and 14.

The invention is directed to a system and apparatus for controlling the operation of the motors, one of the purposes of the control system being to cause the simultaneous operation of the motors at the same speed. To secure this result the control system includes a main valve means 15 having a pair of ports 16 and 17. These ports may serve either as inlet or outlet ports, depending upon the direction of operation of the fluid motors 10 which is under the control of a selector valve 18 connected with the ports 16 and 17 by passages 19 and 20, respectively. Valve 18 is also connected by passages 21 and 22, respectively, with a source of fluid pressure (not shown) and the atmosphere or other region of reduced pressure. An element 23 in valve 18 is movable to alternately connect one of the ports 16 and 17 with the fluid pressure source and the other with exhaust. The valve 15 is also provided with ports 24 and 25, the former being connected by a passage 26 with passages 13 which extend to ports 11 of the motor 10. As previously mentioned, two motors are illustrated; therefore, two passages 13 have been provided. Two passages 14 are also provided, these being connected by a passage 27 with the main valve port 25.

The valve 15 also includes a spool element 28 which is movable in the valve casing 29 to control flow between ports 16 and 24 and ports 25 and 17. To effect the movement of the spool 28 an actuator designated generally by the numeral 30 has been provided. This actuator is responsive to fluid pressure, and, in the structure selected for illustration, the actuator takes the form of a power cylinder 31 and piston 32, the latter being slidable in the former.

A coil spring 33 is disposed between the piston and one end of the cylinder to urge the piston in one direction. The piston is connected by a rod 34 with the valve spool 28 to transmit motion from the former to the latter. Movement of the piston by the spring tends to place the spool in a valve closing position, in which communication between the source of fluid pressure and the motors and between the latter and the exhaust region is interrupted.

To effect opening movement of the valve, fluid under pressure is introduced to the cylinder 31 at the end opposite that occupied by the spring 33. This introduction of fluid take place through a passage 35 leading from the inlet conduit 21 to a port in the wall of cylinder 31. Passage 35 may be provided with a valve 36 for initiating and interrupting the operation of the system. The passage is also provided with a restriction or orifice 37, the purpose of which will be made apparent hereinafter.

To further control the operation of the piston 32 and valve spool 28, a bleed-off control designated generally by the numeral 38 has been provided. This control includes a passage 39 extending from the cylinder and leading to a bleed-off port 40. Flow through this port is governed by a valve element 41 which is moved in response to variations in the rate of fluid flow to the fluid motors 10. To effect the movement of the valve 41, the branch lines 13 are provided with positive displacement fluid metering devices 42. The devices illustrated consist of nutating disk type fluid motors, the disks being illustrated by dotted lines in the drawing. It is obvious that other types of positive displacement metering devices could be employed, the only requirement being that they have rotatable elements.

In the illustration the rotatable elements, namely, the shafts 43 of the members 42, are coupled to one another so that they will operate in unison. These rotatable elements are connected with a centrifugal member 44 of the flyball or other suitable type which will respond to the rotation of the shafts to effect the movement of the valve 41. It will be obvious that when the shafts 43 revolve, the weights 45 of the member 44 will move outwardly in response to centrifugal force, causing the valve 41 to be moved away or withdrawn from the port or orifice 40. This movement is in opposition to a spring 46 which tends to move the weights 45 toward one another and the valve 41 toward a position to close the port 40. The force of the spring 46 may be varied through the manipulation of an adjusting screw or similar device 47. The movement of the screw is transmitted to the spring 46 through a lever 48. It will be obvious that if the force of the spring 46 is increased, the metering devices must operate at a greater rate to effect movement of the valve 41 from the orifice 40.

Operation of the system is as follows:

Assuming that passage 21 is connected with a suitable source of fluid pressure, that valve spool 28 is in position to interrupt flow from passage 21 to the motors, and that valve 36 is closed, the system and the motors 10 will then be idle. Assume also that element 23 in selector valve 18 is in position to establish communication between passages 21 and 19 and between 20 and 22. If valve 36 is then opened, fluid will flow through passage 35 into cylinder 31 and pressure will increase in cylinder 31 beneath piston 32. The force of this pressure will move the piston 32 in an upward direction, causing similar movement on the part of spool 28. After sufficient movement has taken place, communication will be established between passages 19 and 26, and fluid may then flow to the inlet ports of motors 10. As fluid flows through branch passages 13, rotary motion will be imparted thereby to the rotatable elements of the metering devices 42. It will be apparent that since these metering devices are of the positive displacement type and the rotatable elements thereof are coupled together, the same volume of fluid will flow through branch passages 13 to the motors 10. In other words, each motor will receive the same volume of fluid and, therefore, will be caused to operate at the same rate. Any tendency of either motor to vary in operation will be sensed by the metering device therefor and transmitted to the other metering device to cause the other motor to operate in the same manner. Fluid flowing from the motors through ports 12 will be conducted by passage 27 to the valve 15 and thence to exhaust.

When the rate of flow of fluid through the metering devices reaches a value determined by the setting of spring 46, valve 41 will start to move away from port 40 and fluid will be bled from the lower end of cylinder 31. Sufficient movement of valve 41, to permit a greater quantity of fluid to flow from the cylinder than is admitted through restriction 37, will cause the fluid pressure beneath piston 32 to fall, and spring 33 will then move the piston in a downward direction, causing valve spool 28 to move toward a closed position. The volume of fluid flowing to the motors will then be reduced, causing a reduction in the speed of rotation of the shafts 43 and governor type mechanism 44. Valve 41 will then be moved toward a closed position to restrict the flow of fluid from the cylinder 31. Fluid pressure will again tend to increase beneath piston 32, causing it to move valve spool 28 toward an open position once more. The governor type control and the actuator will quickly reach a balanced position wherein the fluid motors will operate at a relatively constant speed. This speed will, of course, be determined by the setting of the adjusting screw 47.

If it is desired to reverse the direction of operation of the motors 10, the selector valve 18 may be adjusted to establish communication between supply line 21 and passage 20 and between passage 19 and exhaust 22. In this arrangement, metering devices 42 will be in the exhaust lines and operated by fluid flowing from fluid motors 10, but the control system will function the same as before.

It will be obvious that many minor changes may be made in the construction and relation of the parts making up the system without departing from the spirit and scope of the invention as above set forth.

I claim:

1. Control means for a plurality of fluid motors comprising: valve means connected between a source of pressure fluid and the fluid motors; a metering device between said valve means and each fluid motor, said metering devices being actuated by fluid supplied to the fluid motors; means coupling said metering devices for operation in unison; actuating means for said valve means; and means driven by and responsive to the operation of said metering devices to control the operation of said valve actuating means.

2. Control means for a plurality of fluid motors comprising: valve means connected between a source of pressure fluid and the fluid motors; a positive displacement metering device between said valve means and each fluid motor, said metering devices being actuated by fluid supplied to the fluid motors; means coupling said metering devices for operation in unison; actuating means for said valve means; and means driven by and responsive to the operation of said metering devices to control the operation of said valve actuating means.

3. Control means for a plurality of fluid motors comprising: valve means connected between a source of pressure fluid and the fluid motors; a positive displacement metering device between said valve means and each fluid motor, said metering devices having rotatable elements driven by fluid flowing to the fluid motors; means coupling the rotatable elements of said metering devices for operation in unison; actuating means for said valve means; and governor means driven by and responsive to the rate of operation of the rotatable elements of said metering devices to control the operation of said valve actuating means.

4. Control means for a plurality of fluid motors comprising: valve means connected between a source of pressure fluid and the fluid motors; a positive displacement metering device between said valve means and each fluid motor, said metering devices being actuated by fluid supplied to the fluid motors; means coupling said metering devices for operation in unison; fluid pressure responsive actuating means for said valve means; and governor means driven by and responsive to the operation of said metering devices to control the operation of said valve actuating means.

5. Control means for a plurality of fluid motors comprising: valve means connected between a source of pressure fluid and the fluid motors; a positive displacement metering device between said valve means and each fluid motor, said metering devices being actuated by fluid flowing to the fluid motors; means coupling said metering devices for operation in unison; fluid pressure responsive actuating means operatively related to said valve means; and governor means driven by and responsive to the operation of said metering devices to control the application of fluid pressure to said actuating means.

6. Control means for a plurality of fluid motors comprising: valve means connected between a source of pressure fluid and the fluid motors; a positive displacement metering device between said valve means and each fluid motor, said metering devices being actuated by fluid flowing to the fluid motors; means coupling said metering devices for operation in unison; fluid pressure responsive actuating means operatively related to said valve means; and a second valve means responsive to the rate of operation of said metering devices to control the application of fluid pressure to said actuating means.

7. Control means for a plurality of fluid motors comprising: valve means connected between a source of pressure fluid and the fluid motors; a positive displacement metering device between said valve means and each fluid motor, said metering devices having rotatable elements driven by fluid supplied to the fluid motors; means coupling the rotatable elements of said metering devices for operation in unison; fluid pressure responsive actuating means operatively related to said valve means; a second valve means for controlling the application of fluid pressure to said valve actuating means; and means driven by the rotatable elements of said metering devices and responsive to centrifugal force to actuate said second valve means.

8. Control means for a plurality of fluid motors comprising: valve means connected between a source of pressure fluid and the fluid motors and between the latter and a region of lower pressure to control the flow of operating fluid to and from the fluid motors; a positive displacement fluid metering device between said valve means and each fluid motor, said metering devices being actuated by fluid flowing to the fluid motors; means coupling said metering devices for operation in unison; actuating means for said valve means; and means responsive to the rate of operation of said metering devices to control the operation of said valve actuating means.

9. Control means for a plurality of fluid motors comprising: valve means connected between a source of pressure fluid and the fluid motors; a positive displacement metering device between said valve means and each fluid motor, said metering devices being of the nutating disk type with rotatable elements; means coupling the rotatable elements of said metering devices for operation in unison; fluid pressure responsive actuating means for said valve means; a second valve means for controlling the application of fluid pressure to said valve actuating means; and means driven by the rotatable elements of said metering devices and responsive to centrifugal force to actuate said second valve means.

10. Control means for a plurality of fluid motors comprising: valve means connected between a source of pressure fluid and the fluid motors; a positive displacement metering device between said valve means and each fluid motor, said metering devices having rotatable elements driven by fluid flowing to the fluid motors; means coupling the rotatable elements of said metering devices for operation in unison; fluid pressure responsive actuating means for said valve means; bleed-off means for controlling the operation of said fluid pressure responsive valve actuating means; and means driven by the rotatable elements of said metering devices to effect the operation of said bleed-off means.

11. Control means for a plurality of fluid motors comprising: a main valve means connected between a source of pressure fluid and the fluid motors; a reversing valve between said main valve means and the source of pressure fluid; a positive displacement metering device between said main valve means and each fluid motor, said metering devices having rotatable elements driven by the motor operating fluid; means coupling the rotatable elements of the metering devices for operation in unison; actuating means for said main valve means; and governor means driven by and responsive to the rate of operation of the rotatable elements of said metering devices to control the operation of said main valve actuating means.

12. Control means for a plurality of fluid motors comprising: a main valve means with a plurality of inlet and outlet ports; a reversing valve communicating with a pair of inlet and outlet ports and operative to alternately connect said ports with a source of pressure fluid and exhaust; a positive displacement metering device for each motor, said metering devices communicating with another of the ports of said main valve and having rotatable elements driven by the motor operating fluid; passage means communicating with another of the ports of said main valve and said fluid motors; means coupling the rotatable elements of the metering devices for operation in unison; actuating means for said main valve means; and governor means driven by and responsive to the rate of operation of the rotatable elements of said metering devices to control the operation of said main valve actuating means.

References Cited in the file of this patent

UNITED STATES PATENTS

| | | |
|---|---|---|
| 2,185,015 | Low | Dec. 26, 1939 |
| 2,291,578 | Johnson | July 28, 1942 |
| 2,650,573 | Hickman | Sept. 1, 1953 |

FOREIGN PATENTS

| | | |
|---|---|---|
| 693,057 | Great Britain | June 24, 1953 |